US012692127B2

(12) United States Patent
Eastman et al.

(10) Patent No.: US 12,692,127 B2
(45) Date of Patent: Jul. 28, 2026

(54) REINFORCED FABRIC ELEVATOR BELT WITH IMPROVED INTERNAL WEAR RESISTANCE

(71) Applicant: OTIS ELEVATOR COMPANY, Farmington, CT (US)

(72) Inventors: Scott Alan Eastman, Glastonbury, CT (US); Daniel A. Mosher, Glastonbury, CT (US); Wenping Zhao, Glastonbury, CT (US); John P. Wesson, West Hartford, CT (US); Brad Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 869 days.

(21) Appl. No.: 17/820,296

(22) Filed: Aug. 17, 2022

(65) Prior Publication Data

US 2022/0388812 A1 Dec. 8, 2022

Related U.S. Application Data

(62) Division of application No. 16/083,567, filed as application No. PCT/US2017/021085 on Mar. 7, 2017, now Pat. No. 11,465,885.

(Continued)

(51) Int. Cl.
*B66B 7/06* (2006.01)
*B66B 9/00* (2006.01)

(Continued)

(52) U.S. Cl.
CPC ................ *B66B 7/062* (2013.01); *B66B 9/00* (2013.01); *D07B 1/005* (2013.01); *D07B 1/162* (2013.01);

(Continued)

(58) Field of Classification Search
CPC .......... D07B 1/005; D07B 1/162; D07B 1/22; D07B 2201/1012; D07B 2201/201;

(Continued)

(56) References Cited

U.S. PATENT DOCUMENTS 2,326,719 A 8/1943 Myers
3,457,717 A * 7/1969 Durkee et al. ......... D07B 1/162 57/210

(Continued)

FOREIGN PATENT DOCUMENTS

CN 101663222 A 3/2010
CN 102264623 A 11/2011

(Continued)

OTHER PUBLICATIONS

Chinese Office Action Issued In Application No. 201780017703.7, Mail Date Sep. 2, 2019, 7 Pages.

(Continued)

*Primary Examiner* — Xiao S Zhao
*Assistant Examiner* — Joseph S Leyson
(74) *Attorney, Agent, or Firm* — CANTOR COLBURN LLP

(57) ABSTRACT

A belt for suspending and/or driving an elevator car includes a plurality of tension elements extending longitudinally along a length of the belt, at least one tension element of the plurality of tension elements having one or more tension element coating layers applied thereto. A plurality of fibers are interlaced with the plurality of tension elements forming a composite belt structure. A belt coating at least partially encapsulates the composite belt structure. A method of forming a belt for suspending and/or driving an elevator car includes forming a plurality of tension elements and applying one or more coating layers to at least one tension element of the plurality of tension elements. A plurality of fibers are (Continued)

interlaced with the plurality of tension elements to form a composite belt structure. A belt coating is applied to the composite belt structure to at least partially encapsulate the composite belt structure.

6 Claims, 4 Drawing Sheets

Related U.S. Application Data

(60) Provisional application No. 62/305,667, filed on Mar. 9, 2016.

(51) Int. Cl.

| | |
|---|---|
| ***D07B 1/00*** | (2006.01) |
| ***D07B 1/16*** | (2006.01) |
| ***D07B 1/22*** | (2006.01) |
| ***D07B 5/00*** | (2006.01) |
| ***D07B 5/04*** | (2006.01) |

(52) U.S. Cl.
CPC ............. *D07B 5/006* (2015.07); *D07B 5/045* (2021.01); *D07B 1/22* (2013.01); *D07B 2201/1012* (2013.01); *D07B 2201/201* (2013.01); *D07B 2501/2007* (2013.01)

(58) Field of Classification Search
CPC .... D07B 2201/2044; D07B 2201/2045; D07B 2207/404; D07B 2401/205; D07B 2501/2007; B66B 7/062; B66B 9/00
See application file for complete search history.

(56) References Cited

U.S. PATENT DOCUMENTS

| | | | |
|---|---|---|---|
| 5,566,786 A | 10/1996 | De Angelis et al. | |
| 5,609,242 A | 3/1997 | Hutchins et al. | |
| 6,739,433 B1 | 5/2004 | Baranda et al. | |
| 6,983,826 B2 | 1/2006 | Wake et al. | |
| 7,217,210 B2 | 5/2007 | Wood | |
| 7,341,076 B2 | 3/2008 | Braekevelt et al. | |
| 8,052,820 B2 | 11/2011 | O'Donnell et al. | |
| 8,336,675 B2 | 12/2012 | Ach et al. | |
| 8,444,515 B2 | 5/2013 | Baranda et al. | |
| 8,556,041 B2 | 10/2013 | Mustalahti et al. | |
| 8,677,726 B2 | 3/2014 | Wesson et al. | |
| 9,115,466 B2 | 8/2015 | Wesson et al. | |
| 9,758,345 B2 | 9/2017 | Ach | |
| 10,549,952 B2 | 2/2020 | Zhao | |
| 2008/0156592 A1 | 7/2008 | Thompson et al. | |
| 2010/0133046 A1 | 6/2010 | Allwardt et al. | |
| 2011/0000746 A1 | 1/2011 | Pelto-Huikko et al. | |
| 2011/0240408 A1 | 10/2011 | Wesson et al. | |
| 2011/0259677 A1 | 10/2011 | Dudde et al. | |
| 2012/0211310 A1* | 8/2012 | Peric | B66B 7/062 187/254 |
| 2013/0042939 A1 | 2/2013 | Wesson et al. | |
| 2013/0167967 A1 | 7/2013 | Wesson et al. | |
| 2014/0318902 A1 | 10/2014 | Pelto-Huikko et al. | |
| 2015/0017436 A1 | 1/2015 | Krishnan et al. | |
| 2015/0191330 A1 | 7/2015 | Zhao et al. | |
| 2017/0057787 A1 | 3/2017 | Zhao et al. | |
| 2017/0066630 A1 | 3/2017 | Gurvich et al. | |
| 2017/0101293 A1 | 4/2017 | Eastman et al. | |
| 2018/0162695 A1 | 6/2018 | Eastman et al. | |
| 2018/0251342 A1 | 9/2018 | Eastman et al. | |
| 2018/0282125 A1 | 10/2018 | Zhao | |
| 2018/0305179 A1 | 10/2018 | Guilani | |
| 2018/0305180 A1 | 10/2018 | Guilani | |
| 2018/0305182 A1 | 10/2018 | Zhao et al. | |
| 2019/0062117 A1 | 2/2019 | Zhao et al. | |
| 2019/0084803 A1 | 3/2019 | Eastman et al. | |
| 2019/0144241 A1 | 5/2019 | Guilani | |
| 2019/0168999 A1 | 6/2019 | Guilani | |
| 2019/0218061 A1 | 7/2019 | Eastman et al. | |
| 2019/0382242 A1 | 12/2019 | Mosher et al. | |
| 2020/0002123 A1 | 1/2020 | Rajagopalan et al. | |
| 2020/0002132 A1 | 1/2020 | Mosher et al. | |
| 2020/0318286 A1 | 10/2020 | Eastman et al. | |
| 2020/0385237 A1 | 12/2020 | Humbert et al. | |
| 2020/0407195 A1 | 12/2020 | Zhao et al. | |

FOREIGN PATENT DOCUMENTS

| | | |
|---|---|---|
| CN | 202030973 U | 11/2011 |
| CN | 103108825 A | 5/2013 |
| DE | 202008001786 U1 | 12/2008 |
| EP | 0228725 A1 | 7/1987 |
| EP | 1886796 A1 | 2/2008 |
| KR | 20130064121 A | 6/2013 |
| KR | 101445652 B1 | 9/2014 |
| WO | 2012039781 A1 | 3/2012 |
| WO | 2013105958 A1 | 7/2013 |
| WO | 2015134023 A1 | 9/2015 |

OTHER PUBLICATIONS

International Search Report for International Application No. PCT/US2017/021085; International Filing Date Mar. 7, 2017; Date of Mailing May 24, 2017; 6 Pages.

IPRP for Application No. PCT/US2017/021085, Mailed Sep. 20, 2018.

Written Opinion for Application No. PCT/US2017/021085, Issued May 24, 2017.

Office Action for Chinese Application No. 201780017703.7, Issued Jun. 5, 2020.

Office Action for Korean Application No. 10-2018-7028963, Issued Dec. 9, 2021.

Office Action for Korean Application No. 10-2018-7028963, Issued Feb. 9, 2022.

Office Action for Chinese Application No. 201780017703.7 Issued Mar. 2, 2020.

Office Action for Indian Application No. 201817033917, Issued Mar. 9, 2021.

Office Action for Korean Application No. 10-2022-7011906, Issued Jun. 10, 2022.

Office Action for Korean Application No. 10-2018-7028963, Issued Aug. 9, 2021.

* cited by examiner

- Prior Art -

REINFORCED FABRIC ELEVATOR BELT WITH IMPROVED INTERNAL WEAR RESISTANCE

CROSS-REFERENCE TO RELATED APPLICATIONS

This application is a divisional of U.S. patent application Ser. No. 16/083,567 filed Sep. 10, 2018, which is a national stage of International Patent Application No. PCT/US2017/021085 filed Mar. 7, 2017 which claims the benefit of U.S. Provisional Patent Application No. 62/305,667 filed Mar. 9, 2016 the disclosure of which is incorporated herein by reference in its entirety.

BACKGROUND

The subject matter disclosed herein relates to belts such as those used in elevator systems for suspension and/or driving of the elevator car and/or counterweight.

Conventional elevator systems use rope formed from steel wires as a lifting tension load bearing member. Other systems utilize a belt formed from a number of steel cords, formed from steel wires, retained in a polymer jacket formed from, for example, thermoplastic polyurethane. The cords act as the load supporting tension member, while the jacket holds the cords in a stable position relative to each other, and provides a frictional load path to provide traction for driving the belt.

Monolithic jacket materials used to encase tension members can pose manufacturing challenges. In addition, altering composition such as through the addition of fillers to gain performance enhancement such as fire resistance, corrosion resistance, wear resistance, traction and/or mechanical performance can have many challenges. Adding filler or otherwise changing material composition can make processing the resulting material much more challenging and issues with filler/polymer compatibility often occur. All of these issues must be addressed without sacrificing traction, durability, and other key performance metrics. One approach to alleviating these challenges is to take a composite approach which decouples certain critical performance properties. This can be achieved by replacing a monolithic polymer jacket with a composite fabric and coating system. The fabric predominantly functions as the structural component of the composite jacket while maintaining flexibility, and the coating, or multiplicity thereof, predominantly functions to provide traction and other performance properties.

The composite fabric typically includes yarns or other non-metallic fibers that are woven together with the steel cords, or otherwise used to position the cords. The fabric and cord structure is then typically coated with an elastomer. One challenge in the composite fabric belt is generating sufficient thickness in the fabric and coating layers to cover the steel cords to ensure durability and service life of both the fabric and the steel cords.

SUMMARY

In one embodiment, a belt for suspending and/or driving an elevator car includes a plurality of tension elements extending longitudinally along a length of the belt, at least one tension element of the plurality of tension elements having one or more tension element coating layers applied thereto. A plurality of fibers are interlaced with the plurality of tension elements forming a composite belt structure. A belt coating at least partially encapsulates the composite belt structure.

Additionally or alternatively, in this or other embodiments the tension element is a cord formed from a plurality of wires.

Additionally or alternatively, in this or other embodiments the one or more tension element coating layers includes a polymeric material and/or a fiber material.

Additionally or alternatively, in this or other embodiments the fiber material includes one or more Kevlar, aramid, polyester, nylon, polyphenylene sulfide, glass, cotton, jute, hemp, or any combination or blends thereof.

Additionally or alternatively, in this or other embodiments the one or more tension element coating layers includes an adhesive layer to promote adhesion of the tension element coating layers to the tension element.

Additionally or alternatively, in this or other embodiments the one or more tension element coating layers includes a fiber adhesion layer to promote adhesion to the plurality of fibers and/or the belt coating.

In another embodiment, a method of forming a belt for suspending and/or driving an elevator car includes forming a plurality of tension elements and applying one or more coating layers to at least one tension element of the plurality of tension elements. A plurality of fibers are interlaced with the plurality of tension elements to form a composite belt structure. A belt coating is applied to the composite belt structure to at least partially encapsulate the composite belt structure.

Additionally or alternatively, in this or other embodiments each tension element of the plurality of tension elements is formed from a plurality of wires.

Additionally or alternatively, in this or other embodiments the one or more tension element coating layers includes polymeric material and/or a fiber material.

Additionally or alternatively, in this or other embodiments the fiber material includes one or more of Kevlar, aramid, polyester, nylon, polyphenylene sulfide, glass, cotton, jute, hemp, or any combination or blends thereof.

Additionally or alternatively, in this or other embodiments the one or more coating layers are applied to the plurality of tension elements via an extrusion, dip, spray, evaporation, roll-on, or thermal fusion process.

Additionally or alternatively, in this or other embodiments a first coating layer is applied to the plurality of tension elements to promote adhesion to the plurality of tension members.

Additionally or alternatively, in this or other embodiments a second coating layer is applied to the plurality of tension elements to promote adhesion of the belt coating.

Additionally or alternatively, in this or other embodiments the one or more coating layers are heated to adhere the one or more coating layers to the tension elements.

In yet another embodiment, an elevator system includes a hoistway, a drive machine having a traction sheave coupled thereto, an elevator car movable within the hoistway, a counterweight movable within the hoistway and at least one belt connecting the elevator car and the counterweight. The belt is arranged in contact with the traction sheave such that operation of the drive machine moves the elevator car between a plurality of landings. The at least one belt includes a plurality of tension elements extending longitudinally along a length of the belt and one or more tension element coating layers applied to a least one tension element of the plurality of tension elements. A plurality of fibers are interlaced with the plurality of tension elements forming a composite belt structure, and a belt coating at least partially encapsulates the composite belt structure.

Additionally or alternatively, in this or other embodiments the tension element is a cord formed from a plurality of wires.

Additionally or alternatively, in this or other embodiments the one or more tension element coating layers includes polymeric material and/or a fiber material.

Additionally or alternatively, in this or other embodiments the fiber material includes one or more of Kevlar, aramid, polyester, nylon, glass, cotton, jute, hemp, or any combination or blends thereof.

Additionally or alternatively, in this or other embodiments the one or more tension element coating layers includes an adhesive layer to promote adhesion of the tension element coating layers to the tension element.

Additionally or alternatively, in this or other embodiments the one or more tension element coating layers includes a fiber adhesion layer to promote adhesion to the plurality of fibers and/or the belt coating.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
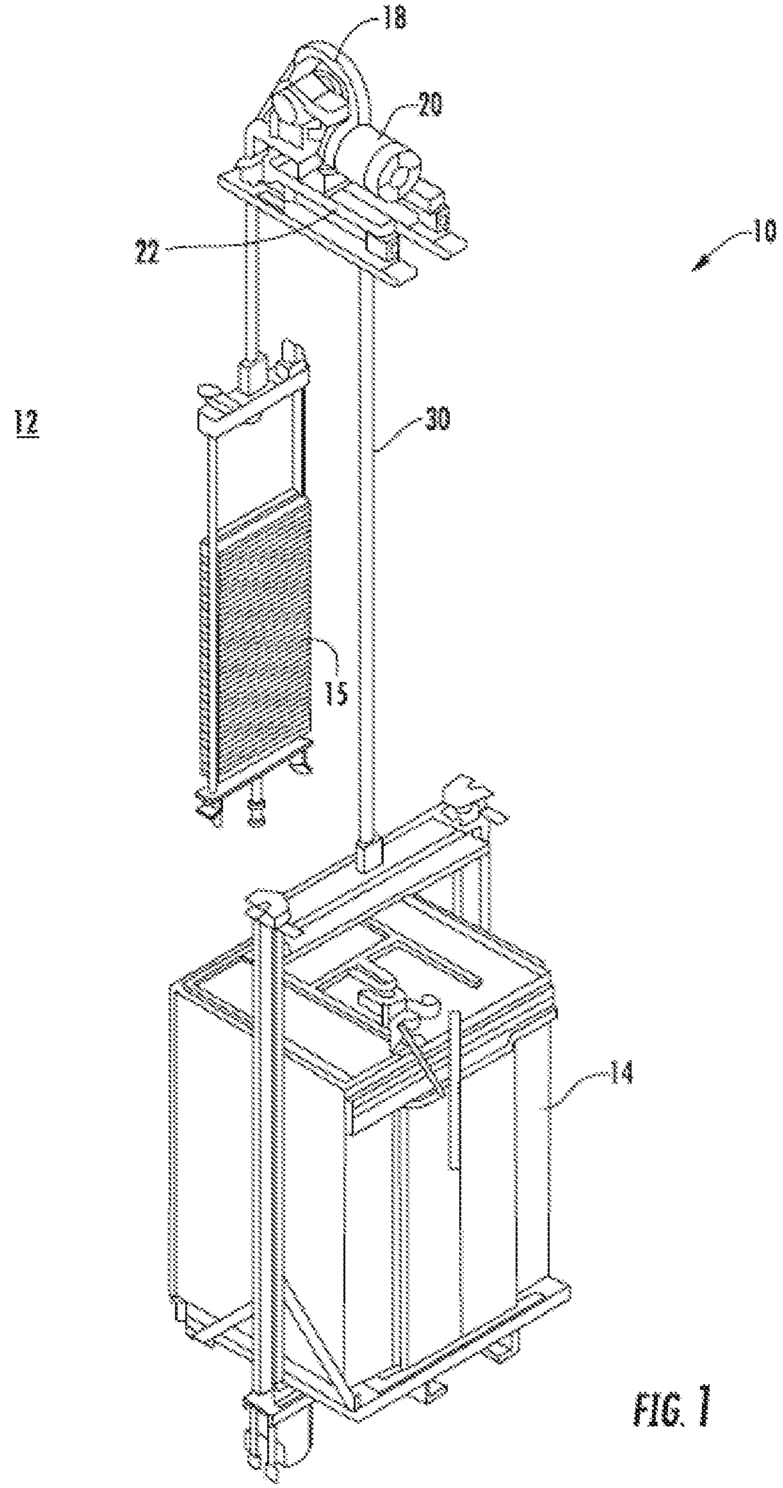
FIG. 1 is a schematic of an exemplary elevator system.

Referring now to FIG. 1, an exemplary embodiment of an elevator system 10 is illustrated. The elevator system 10 includes an elevator car 14 configured to move vertically upwardly and downwardly within a hoistway 12 along a plurality of car guide rails (not shown). Guide assemblies mounted to the top and bottom of the elevator car 14 are configured to engage the car guide rails to maintain proper alignment of the elevator car 14 as it moves within the hoistway 12.

The elevator system 10 also includes a counterweight 15 configured to move vertically upwardly and downwardly within the hoistway 12. The counterweight 15 moves in a direction generally opposite the movement of the elevator car 14 as is known in conventional elevator systems. Movement of the counterweight 15 is guided by counterweight guide rails (not shown) mounted within the hoistway 12. In the illustrated, non-limiting embodiment, at least one belt 30, coupled to both the elevator car 14 and the counterweight 15 cooperates with a traction sheave 18 mounted to a drive machine 20. To cooperate with the traction sheave 18, at least one belt 30 bends in a first direction about the traction sheave 18. In one embodiment, any additional bends formed in the at least one belt 30 must also be in the same first direction.

The drive machine 20 of the elevator system 10 is positioned and supported at a mounting location atop a support member 22, such as a bedplate for example, in a portion of the hoistway 12 or a machine room. Although the elevator system 10 illustrated and described herein has a 1:1 roping configuration, elevator systems 10 having other roping configurations and hoistway layouts are within the scope of the present disclosure. In embodiments having alternative roping configurations, a twist may be arranged in the belts 30, as known in the art, to avoid reverse bends or other arrangements where all bending of the belts 30 occurs in the same direction.

Figure 2:
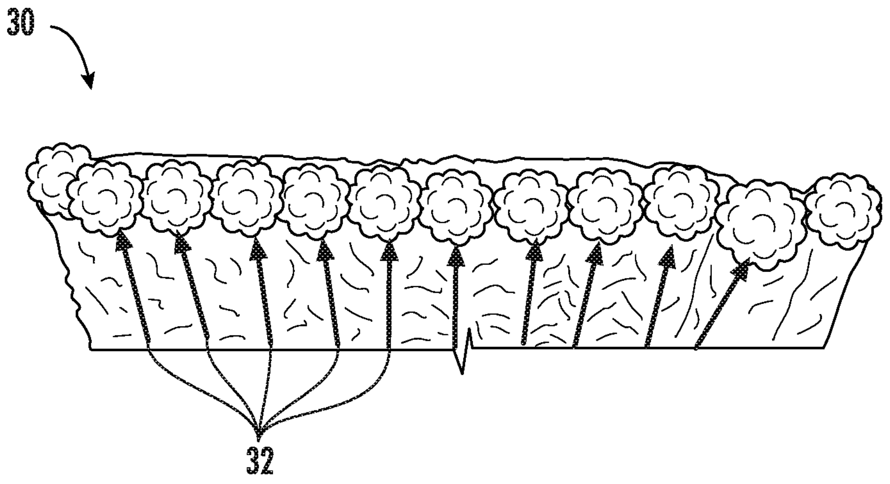
FIG. 2 is a cross-sectional view of an embodiment of an elevator belt.
Figure 3:
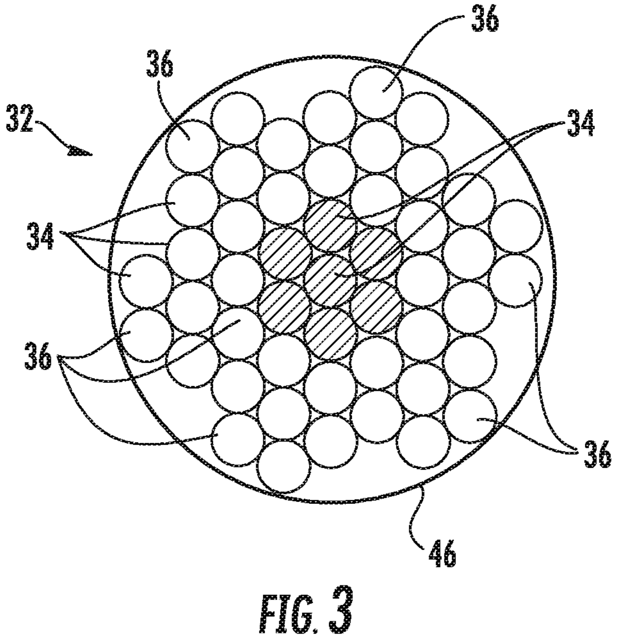
FIG. 3 is a cross-sectional view of an embodiment of a cord of an elevator belt.

FIG. 2 provides a cross-sectional view of an exemplary belt 30 construction or design. The belt 30 includes a plurality of tension members or cords 32 extending longitudinally along a length of the belt 30. As shown in the cross-sectional view of FIG. 3, each cord 32 may be formed from a plurality of wires 34, formed from steel or other suitable material, which may be arranged into strands 36. The strands 36, in turn, are arranged into the cords 32. Referring again to FIG. 2, the cords 32 are arranged generally parallel to each other and extend in a longitudinal direction that establishes a length of the belt 30. To provide structure to the belt 30 and maintain spacing between the cords 32, the cords 32 are woven, knitted, braided or otherwise intermeshed with one or more types of fibers to form a composite belt 30.

Figure 4:
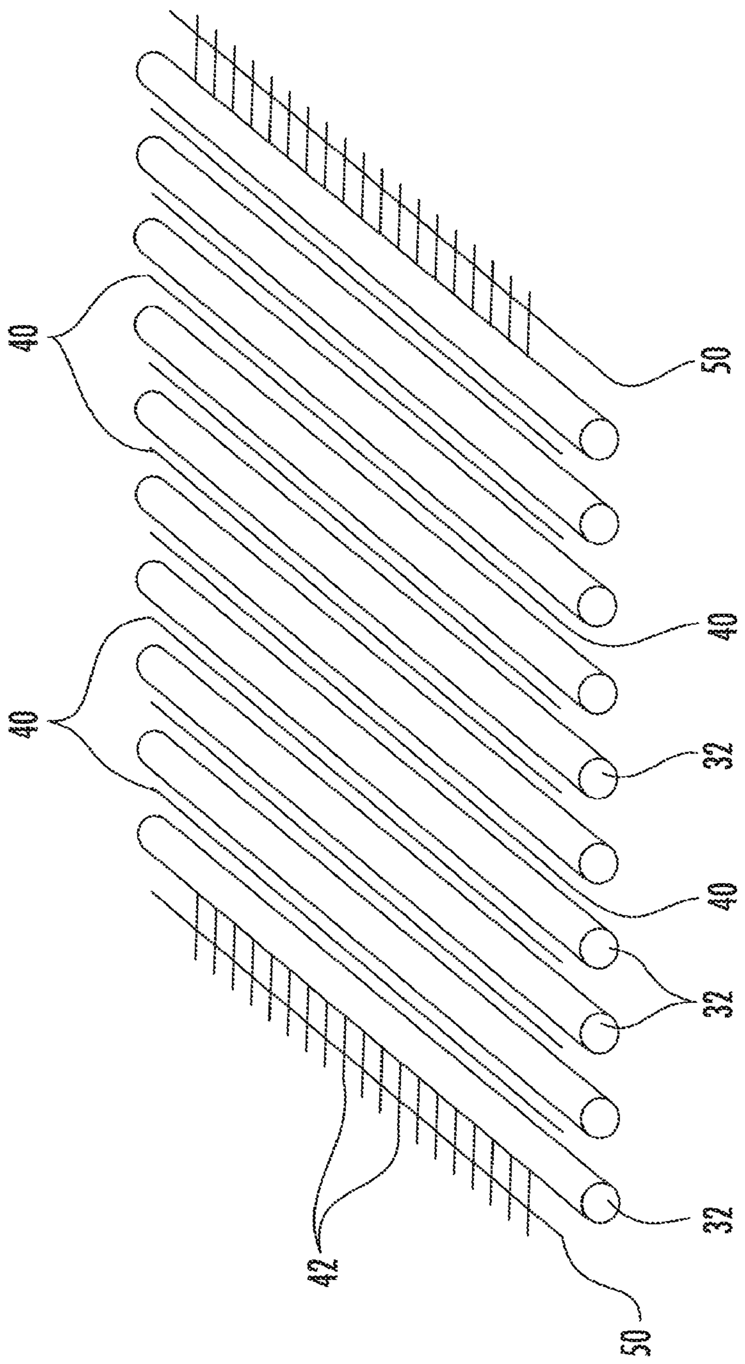
FIG. 4 is a schematic view of an embodiment of a composite elevator belt.

In one embodiment, shown in FIG. 4, the fibers include a plurality of warp fibers 40 extending longitudinally parallel to the cords 32 and a plurality of weft fibers 42 extending laterally across the belt 30, in some embodiments at an angle of 90 degrees relative to the cords 32 and the warp fibers 40. In other embodiments, the weft fibers 42 may be placed at other angles relative to the cords 32, such as 75 degrees and 105 degrees, or 60 degrees and 120 degrees. These angles, however, are merely examples, and one skilled in the art will readily appreciate that other angles may be utilized. The cords 32, warp fibers 40 and weft fibers 42 are interlaced into a woven structure, which in some embodiments also includes one or more edge fibers 50 extending parallel to the cords 32. While in FIG. 4, the weft fibers 42 are at a 90 degree angle relative to the warp fibers 40 and the cords 32 and woven together, it is to be appreciated that other angles and other methods of interlacing the cords 32 with the fibers 40, 42 may be utilized in forming the belt 30. These methods include, but are not limited to, knitting and braiding. In some embodiments, more than one of the above methods may be utilized to form the belt 30.

Figure 5:
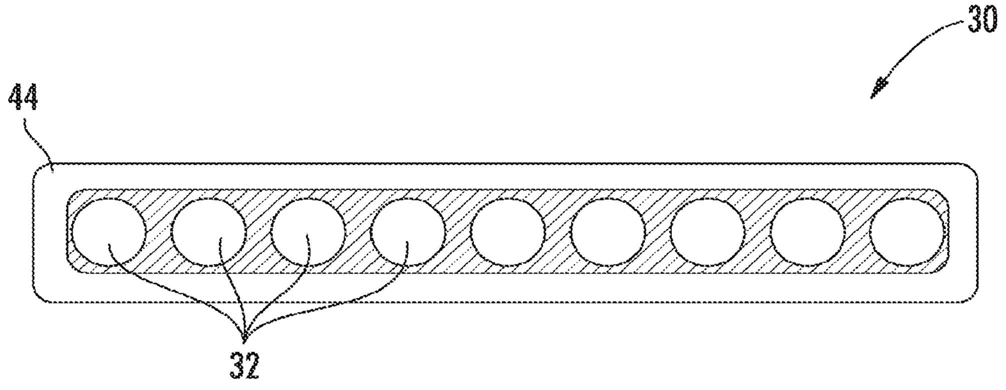
FIG. 5 is another cross-sectional view of an embodiment of an elevator belt.

Referring to FIG. 5, a belt coating 44 is applied to the belt 30 at least partially covering and/or encapsulating the composite structure of the cords 32, the warp fibers 40 and the weft fibers 42. Examples of materials for the belt coating 44 include, but are not limited to polyurethane, styrene butadiene rubber (SBR), nitrile rubber (NBR), acrylonitrile butadiene styrene (ABS), SBS/SEBS plastics, silicone, EPDM rubber, other curable diene based rubber, neoprene, non-curing thermoplastic elastomers, curable extrudable rubber materials, thermoplastics such as nylon, polyester, polyvinyl chloride, polyolefin or the like, each of which can be in the form of a solution, emulsion, prepolymer or other fluid phase.

Referring again to FIG. 3, prior to combing the cords 32 with the warp fibers 40 and the weft fibers 42 to form the belt 30, one or more cord coating layers 46 are applied to the steel cords 32. The cord coating layer 46 may include a polymer sheath of, for example, an elastomeric material. The cord coating layer 46 material is selected to be compatible and can be the same material as with the subsequent belt coating 44 and to match stiffness of the belt 30 construction to avoid localized high stresses. The cord coating layer 46 provides multiple benefits including improved corrosion protection to the cord 32, improved fatigue life of the cords 32, protection of the warp fibers 40 and weft fibers 42 adjacent to the cords 32 from fraying, cutting and wear by reducing and managing contact stresses between the cords 32 and the fibers 40, 42. Further, the cord coating layer 46 may promote adhesion between elements, such as between the cords 32, the fibers 40, 42 and the belt coating 44.

While a cord coating layer 46 of elastomeric material is described above, it is to be appreciated that other cord coating layers 46 may be utilized as an alternative to, or in addition to the elastomeric material. In some embodiments, for example, the cord coating layer 46 may include a fiber, fabric or yarn material. Materials relevant to this structure may include but are not limited to Kevlar, aramid, polyester, nylon, polyphenylene sulfide, glass, cotton, jute, hemp, or any combination or blends thereof. Further, the cord coating layer 46 may vary across the cords 32 of the belt 30, depending on the desired performance properties of the belt 30. For example, some cords 32 may have a cord coating layer 46 of an elastomeric material, while other cords 32 may have a polyester braid cord coating layer 46.

Figure 6:
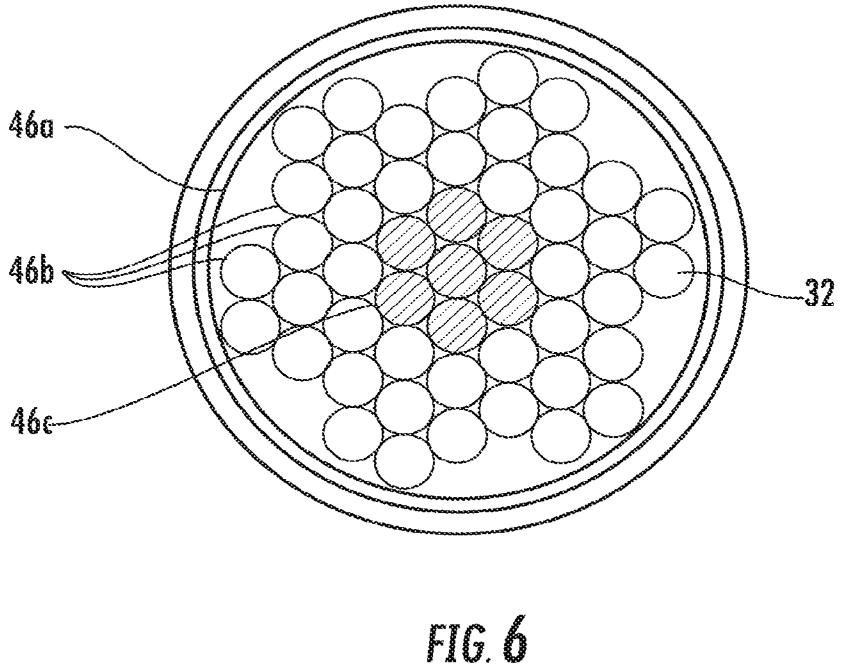
FIG. 6 is a cross-sectional view of an embodiment of a coated cord for an elevator belt.

The cord coating layer 46 may be applied to the steel cord 32 by a variety of processes, for example, by extruding the cord coating layer 46 over the cord 32 or by dipping the cord 32 into the cord coating layer 46 material. Further, in some embodiments the cord coating layer 46 may be applied relatively loosely to the cord 32 then heated to shrink the cord coating layer 46 and adhere the cord coating layer 46 to the cord 32. Additionally or alternatively, the coating layer 46 may be applied via a spray, evaporation or roll-on process. Further, in some embodiments, the coating layer 46 may be applied as a preformed thermoplastic film that is fused to the cord via the application of heat to the thermoplastic film. Further, in some embodiments, as shown in the cross-sectional view of FIG. 6, multiple cord coating layers 46 may be applied to the cord 32. For example, a first cord coating layer 46*a* is an adhesive layer polymer to promote adhesion of the cord coating layers 46 to the cord 32, a second cord coating layer 46*b* is applied over the first cord coating layer 46*a* and is adhered to the cord 32 via the first cord coating layer 46*a*. Finally, a third cord coating layer 46*c* is applied over the second cord coating layer 46*b* and is formulated to promote adhesion with the fibers 40, 42 and/or with the belt coating 44. In some embodiments, a sum of thicknesses of coating layers 46*a*, 46*b* and 46*c* is between about 0.05 millimeters to 2 millimeters. In one embodiment the sum of thicknesses is between 0.100 millimeters and 1.0 millimeters. Further, in some embodiments the adhesive layer 46*a* may be a thermoplastic.

The belt 30 with coated cords 32 substantially improves belt service life compared to a comparable belt with uncoated cords due to reductions in contact stresses between the fabric and steel cords. Further, the belt 30 has improved corrosion resistance compared to a belt with uncoated steel cords.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of forming a belt for suspending and/or driving an elevator car comprising:
- forming a plurality of tension elements;
- applying one or more coating layers to at least one tension element of the plurality of tension elements, the one or more coating layers including a fiber material;
- interlacing a plurality of fibers with the plurality of tension elements to form a composite belt structure;
- applying a belt coating to at least partially encapsulate the composite belt structure;
- wherein the fiber material includes one or more of aramid, polyester, nylon, polyphenylene sulfide, cotton, jute, hemp, or any combination or blends thereof;
- wherein the one or more coating layers are applied to the at least one tension element prior to the interlacing of the plurality of fibers with the plurality of tension elements.

2. The method of claim 1, further comprising forming each tension element of the plurality of tension elements from a plurality of wires.

3. The method of claim 1, further comprising applying the one or more coating layers to the plurality of tension elements via an extrusion, dip, spray, evaporation, roll-on, or thermal fusion process.

4. The method of claim 1, further comprising applying a first coating layer to the plurality of tension elements to promote adhesion to the plurality of tension members.

5. The method of claim 4, further comprising applying a second coating layer to the plurality of tension elements to promote adhesion of the belt coating.

6. The method of claim 1, further comprising heating the one or more coating layers to adhere the one or more coating layers to the tension elements.

* * * * *